United States Patent
Konduru et al.

(10) Patent No.: US 12,177,209 B2
(45) Date of Patent: Dec. 24, 2024

(54) SECURELY REHYDRATING CONTAINERIZED AGENTS

(71) Applicant: Capital One Services, LLC, McLean, VA (US)

(72) Inventors: Anil Konduru, Plano, TX (US); Amit Ramesh Deshpande, McKinney, TX (US); Dillon Forsberg, Aubrey, TX (US); Dirgh Rabadia, Plano, TX (US); Anvitha Banakal Sadananda, Lewisville, TX (US); Jameskutty Mony, Lewisville, TX (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 17/943,637

(22) Filed: Sep. 13, 2022

(65) Prior Publication Data

US 2024/0089248 A1    Mar. 14, 2024

(51) Int. Cl.
*H04L 9/40* (2022.01)

(52) U.S. Cl.
CPC .................................. *H04L 63/083* (2013.01)

(58) Field of Classification Search
CPC .......... H04L 63/083; H04L 63/20; H04L 9/40
USPC .............................................................. 726/9
See application file for complete search history.

(56) References Cited

U.S. PATENT DOCUMENTS

| | | | |
|---|---|---|---|
| 8,572,411 B2 | 10/2013 | Ginter et al. | |
| 9,256,467 B1 | 2/2016 | Singh et al. | |
| 10,212,154 B2 * | 2/2019 | Hallenborg | H04W 12/068 |
| 10,949,240 B2 | 3/2021 | Dornemann et al. | |
| 11,010,258 B2 | 5/2021 | Haridas et al. | |
| 11,201,955 B1 | 12/2021 | Sachdeva et al. | |
| 11,388,054 B2 | 7/2022 | Guim Bernat et al. | |
| 11,709,925 B1 * | 7/2023 | Bellman-Greenwood | G06F 21/46 726/7 |
| 2009/0205036 A1 * | 8/2009 | Slaton | H04L 63/08 726/26 |
| 2011/0314532 A1 * | 12/2011 | Austin | H04L 63/0892 726/8 |
| 2011/0314533 A1 * | 12/2011 | Austin | H04L 63/08 726/9 |
| 2015/0033305 A1 * | 1/2015 | Shear | G06F 21/53 726/11 |
| 2020/0167091 A1 | 5/2020 | Haridas et al. | |
| 2020/0329101 A1 | 10/2020 | Kumar et al. | |
| 2022/0091742 A1 | 3/2022 | Littlefield et al. | |

\* cited by examiner

*Primary Examiner* — Teshome Hailu
(74) *Attorney, Agent, or Firm* — Banner & Witcoff, Ltd.

(57) ABSTRACT

A method, apparatus, and computer-readable medium are described that enable agent instances to be instantiated in secure, containerized environments. When a new container is detected, a list of agent instances expected to be running in a compute instance or in a container may be obtained and compared with status information regarding which agent instances are active. For a non-active agent instance, an agent object and configuration information for the agent instance may be obtained from a storage. Based on the available name, the agent object, and the configuration information, the agent instance may be instantiated and connected to an agent status server. An application related to the new agent instance may be deployed in the secure containerized environment.

20 Claims, 8 Drawing Sheets

SECURELY REHYDRATING CONTAINERIZED AGENTS

TECHNOLOGICAL FIELD

Aspects of the disclosure relate generally to cloud-based data processing operations.

BACKGROUND

Various cloud-based services may be scaled, as needed, to handle variable processing demands of preset processes. These scalable cloud-based services provide increased processing power to accommodate intervals when the demands are high, while reducing the available processing power when demands are low. To accommodate the fluctuating demand, scalable services may dynamically adjust a quantity of virtual processors available to existing processes. Other on-line services include scalable container-based services where developers may increase or decrease a quantity of available containers to accommodate varying processing demands. One or more agent instances, per compute instance, may be used to manage batch jobs performed by containers in the compute instances. When the processes are virtualized in containers, scaling the processes entails increasing the quantity of containers and associated processes, not necessarily the computing power available to any given process. At least one reason for the complicated process of bringing new containers online includes the existence of third-party agents that are not well-integrated with the container-based service. When new containers are started, attempts to scale container-based processes may encounter difficulties upon startup as new instances of third-party agents often require individual, manual instantiation. Dynamically adding new containers with third party agents to support an existing container-based service has proven difficult within secure environments.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

One or more aspects relate to enabling container-based, data processing services to dynamically populate new containers with agents from a secure storage. The agent instances may include native agents (e.g., native to the service providing the container), third-party agents, or a combination of native agents and third-party agents. A self-executing process, executing on a computing device, may be initiated when a new container is detected. The process may obtain a list of agent instances expected to be active in the new container. The process may also obtain a list of agent instances that are currently instantiated in the container. The process may compare the list of active agent instances with the listed of expected agent instances to determine whether any agent instance should be instantiated.

To instantiate an agent instance, the process may obtain, via a keys agent, an access token for accessing a secure storage of agent objects. The access token may be obtained after the process determines that an agent instance needs to be instantiated in a container. In some examples, the access token may be obtained before any determination of whether an agent instance needs to be instantiated.

Using the token, configuration information for the inactive agent instance may be obtained from a storage containing preconfigured agent objects. Also, an available predetermined name for the new agent instance may be obtained. Using the retrieved preconfigured agent object and the available predetermined name, the new agent instance may be instantiated. In addition to instantiating the inactive agent, the instantiation process may connect the newly instantiated agent to a server configured to monitor the deployed agent instances in the containers. Once connected to the server, the newly instantiated agent may be assigned, as part of a task handled by the new container, to perform operations on behalf of a batch-based application. A benefit of the rehydration method and related systems described herein includes the ability to instantiate both native agents (e.g., agents native to the container service) as well as third-party agents requiring specific configurations, while operating in a secure environment. In some aspects, the self-executing process may monitor how often rehydration of an inactive agent instance was unsuccessfully attempted. Upon satisfying a threshold of unsuccessful attempts to instantiate the inactive agent instance, the new container may be inactivated. Based on the inactivation of the new container, a replacement container may be created.

In accordance with one or more aspects, a computer-implemented method may provide a benefit of instantiating agents in containers in which tasks are performed by the instantiated agents. The computer-implemented method may include receiving, for a container, container configuration information that may include a container name and one or more agent identifications associated with one or more agent instances expected to be active in the container; receiving one or more agent identifications of one or more active agent instances having been instantiated in the container; identifying, based on a comparison between the container configuration information and the one or more agent identifications of the one or more active agent instances, an agent identification of a non-instantiated agent instance; and sending, to an authentication process and based on the identification of the agent identification of the non-instantiated agent, a client identification and a password. The computer-implemented method may further include receiving, based on the client identification and the password, an access token; sending, with the access token and based on the identification of the agent identifications of the non-instantiated agent, a request for a preconfigured agent object, wherein the request may include the agent identification of the non-instantiated agent; and receiving, based on the request, the preconfigured agent object associated with the agent identification of the non-instantiated agent. The computer-implemented method may further include instantiating, based on the preconfigured agent object, a new agent instance; and scheduling performance, based on the instantiation of the new agent instance, of a task by the new agent instance. In one or more aspects, the new agent instance may be associated with the container and/or the first predetermined agent instance name.

In further aspects, the names of all instantiated agent instances may have been predetermined. In other aspects, exactly one name may have been received. In other aspects, the first predetermined agent instance name and other names may have been received and the method then selecting from the received names.

In some aspects, the method may further include sending, via an agent status application programming interface (API), the one or more agent identifications of one or more active agent instances having been instantiated in the container. The method may also include sending, via an agent status API and based on the instantiation of the new agent instance, a status of the new agent instance associated with the first predetermined agent instance name. The method may further include determining, based on a determination that the container has been deployed, whether at least one agent instance associated with the container is inactive; and obtaining, based on a determination that the at least one agent instance is inactive, agent instance information for the inactive at least one agent instance. The request may be sent based on the obtained agent instance information.

In some examples, identifying the agent identification of the non-instantiated agent may comprise selecting a first predetermined non-instantiated agent from a plurality of non-instantiated agents. In some examples, the method may further comprise sending, via an agent status application programming interface (API), the one or more agent identifications of one or more inactive agent instances. In some examples, the method may further comprise sending, via an agent status API and based on the instantiation of the new agent instance, a status of the new agent instance. In some examples, the method may further comprise determining, based on a determination that the container has been deployed, whether at least one agent instance associated with the container is inactive; and obtaining, based on a determination that the at least one agent instance is inactive, agent instance information for the inactive at least one agent instance. The sending the request for the preconfigured agent object may be further based on the obtained agent instance information. In some examples, sending the client identification and the password may further comprises sending, via a management agent associated with the container, the client identification and the password. In some examples, sending the client identification and the password may further comprises sending, via a management agent associated with a compute instance, the client identification and the password. The compute instance may comprise the container and at least one additional container.

Additional aspects, configurations, embodiments, and examples are described in more detail below.

BRIEF DESCRIPTION OF THE SEVERAL VIEWS OF THE DRAWINGS

The present disclosure is illustrated by way of example and not limited in the accompanying figures in which like reference numerals indicate similar elements and in which.

Figure 1:
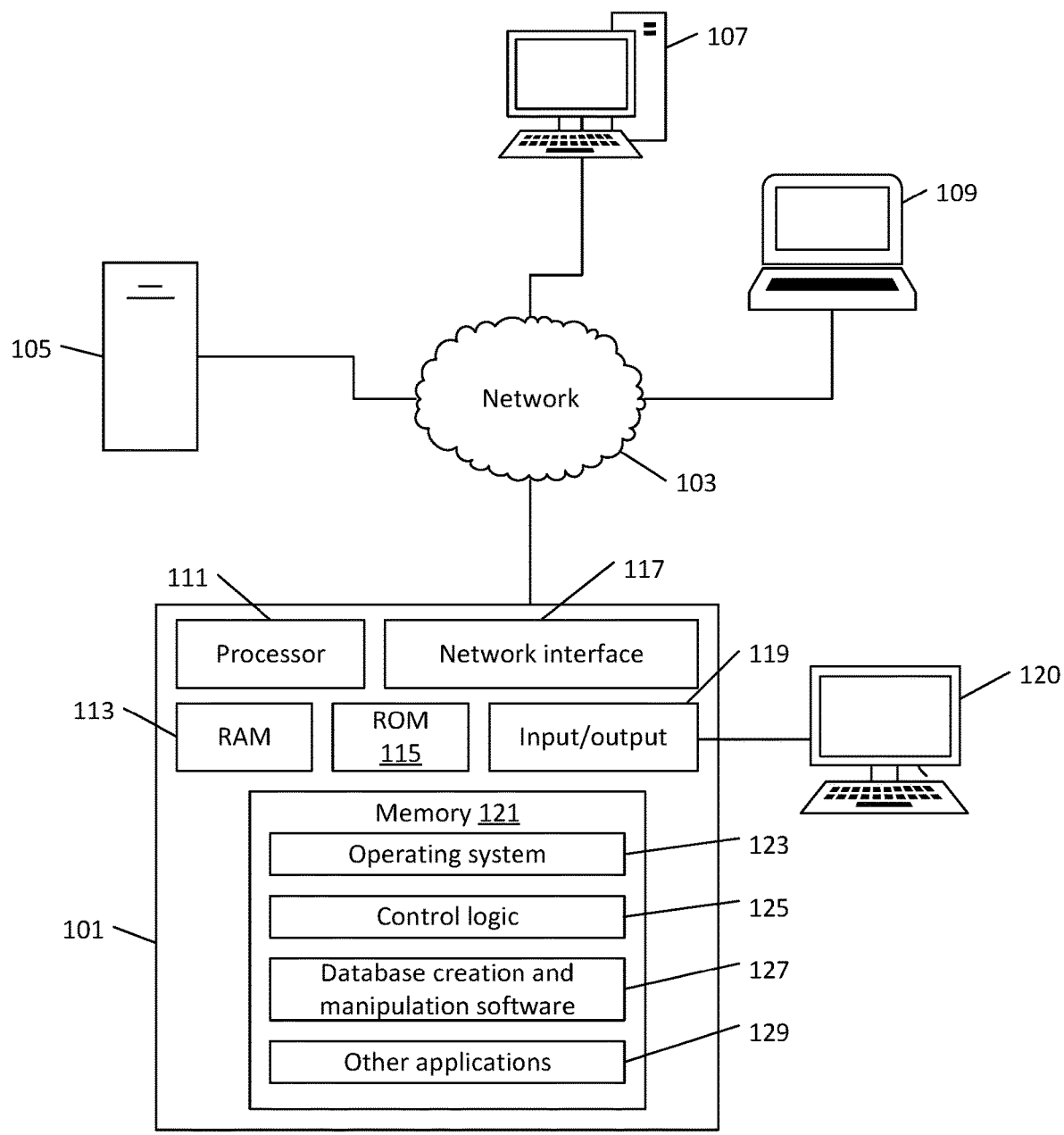
FIG. 1 depicts an example of a computing device and system architecture that may be used in implementing one or more aspects of the disclosure in accordance with one or more illustrative aspects discussed herein.

It will be recognized by the skilled person in the art, given the benefit of this disclosure, that the exact arrangement, sizes and positioning of the components in the figures is not necessarily to scale or required.

DETAILED DESCRIPTION

Certain aspects relate to improving how agents are deployed in an expandable container service. To accommodate fluctuating data processing demands, some cloud-based services are scalable. For instance, Amazon Web Services (AWS), a subsidiary of Amazon.com of Bellevue, Washington, offers the Amazon Elastic Compute Cloud (EC2) service that permits users to rent virtual computers on which to run their own applications. AWS also offers the Amazon Elastic Container Service (ECS) that permits users to define, execute, and scale container-based applications. In some environments, agents, configured to operate in containers, may be provided with preset names to allow persistent connections between workload management servers and servers performing the work. In these environments, when an agent is named and installed, a unique key string identifier file may be generated in order to authenticate the agent with the workload server for future installations. As such, only one instance of an agent with the predefined name may be active at a time as the workload management server may be configured to send work requests based on the predefined names. Where two agent instances share the same predefined name, a conflict may arise as the workload server may not be able to determine which agent is associated with which task. Similarly, the workload server may not be able to resolve communications between the agent instances because of the common, predefined name. The predefined set of names forced developers to manually instantiate agents in containers to prevent conflicts. Re-instantiating agents can be further complicated where the agent objects are stored in systems requiring authenticated access.

One or more aspects of the disclosure relate to a framework for management how agent instances of container may be monitored and, when inactive, re-instantiated from securely stored agent objects. In one or more aspects, an automation process detects when a new container has been created. In response, the automation process obtains an access token and receives, from a remote secure storage, a list of expected agent instances to be active in the new container. The list may contain a list of expected agent instances names of available registered agents. The automation process may invoke a secure application programming interface (API) that identifies the inactive agent to the API and, in response, receives configuration information for the inactive agent. A collection of agent configuration information may be stored separate from the container-based service. For instance, the collection of agent configuration information may be stored in a secure remote server. The collection of agent configuration information may be stored in a cloud-based storage.

During operation, a computing cluster may provide various services. Those services may be handled by one or more compute instances in the cluster. Each compute instance may include one or more containers. A compute instance may provide its portion of the service by performing one or more tasks in the compute instance. A given task may be performed using an application in a container associated with the task. One or more separate containers may be provided in the compute instance. As an example, the containers may be "dockerized" (e.g., via dockerizing a Node.js application to be executable on various platforms in accordance with extensible services provided by Docker Inc., such as at docker.com). The containers may be supported by other extensible services. Each container may be controlled by one or more agent instances. The one or more agent instances may be resident in the containers and/or separate from the containers. The one or more agent instances may be made available for performing the one or more tasks by connecting the one or more agent instances to one or more servers that delegate processing tasks. When an agent instance receives a processing job request, the agent may perform the job in one of the containers and return the results of the job.

In one or more aspects, a process for autonomously instantiating agents for new containers may be realized as follows: upon startup of a container, invoke a startup process; obtain, via the startup process, a list of expected agent instances to be active in the container; identify an inactive agent instance for the container (e.g., an agent instance that is expected to be instantiated but is not); send, to an authentication process and based on the identification of the inactive agent instance, a client identification and a password; and receive an access token; send a request for a preconfigured agent object; receive the preconfigured agent object associated with the agent identification of the non-instantiated agent; send, to an agent name repository and based on the identification of the agent identification of the non-instantiated agent, a request for an available predetermined agent instance name; receive a first predetermined agent instance name; instantiate a new agent instance; and perform a task by the new agent instance. In one or more aspects, the new agent instance may be associated with the container and/or the first predetermined agent instance name.

In some examples, the startup process may handle all agent instantiation and container deployment processes. The agent instantiation may be handled by the startup process and a container deployment handled by a separate process. Where separate processes are used, the processes may be associated with the new container, associated with the compute instance but not restricted to a given new container, or separate from the compute instance. The processes may be co-located or located separate from each other.

Agent objects may be provided in one or more computer-readable information forms (e.g., one or more tables and/or one or more records in one or more databases) by the agent object storage. Agent objects may comprise templates for the creation of agent instances for installation in environments to facilitate the execution of the batch jobs. The agent instances, which control and/or monitor applications executing in containers, may be instantiated in containers, in compute instances, and/or remote from the compute instances.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit", " . . . module" described in the specification mean a unit for performing at least one function or operation, which may be implemented as hardware or software, or as a combination of hardware and software. Throughout the specification, expression "at least one of a, b, and c" may include 'a only', 'b only', 'c only', 'a and b', 'a and c', 'b and c', and/or 'all of a, b, and c'.

It is noted that various connections between elements are discussed in the following description. It is noted that these connections are general and, unless specified otherwise, may be direct or indirect, and that the specification is not intended to be limiting in this respect. As described herein, thresholds are referred to as being "satisfied" to generally encompass situations involving thresholds above increasing values as well as encompass situations involving thresholds below decreasing values. The term "satisfied" is used with thresholds to address when values have passed a threshold and then approaching the threshold from an opposite side as using terms such as "greater than", "greater than or equal to", "less than", and "less than or equal to" can add ambiguity where a value repeated crosses a threshold.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for classifying textual data using a machine-learning classifier.

Figure 2:
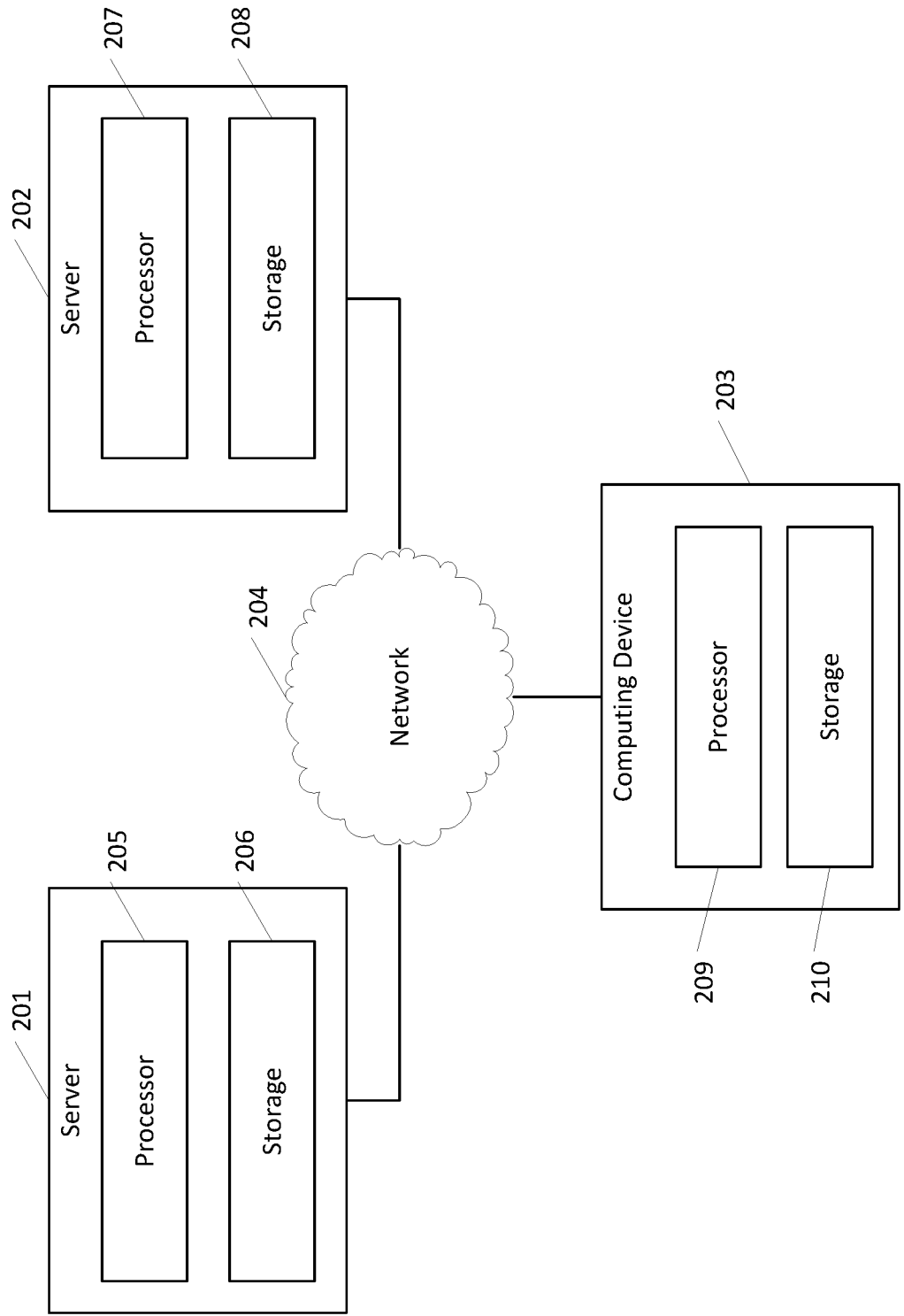
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. A set of devices (e.g., one or more devices 203) of the environment may perform one or more functions described as being performed by another set of devices of the environment. Network 204 may be represented as a single network but may comprise combinations of other networks or subnetworks. For example, the server 201 may store, in storage 206, the list of registered agent identifications, the statuses of the agents, and the agent objects. The processor 205 of the server 201 may provide, upon request, the registered agent identifications, the statuses of the agents, and requested agent objects. One or more of these may be obtained via an exposed API.

Storage 208 of server 202 may include a cluster with one or more compute instances. Each compute instance may include one or more tasks. Each task may be performed by a container. Other relationships between compute instances, tasks, and container may be used. The startup process may be executed by processor 207. The startup process may be executed by processor 209 of the computing device 203.

The computing device 203 may store, in storage 210, data to be processed by job applications. The data may be processed, by processor 207, in batches by the applications implemented using the containers. The agents may be deployed by providing their information to the computing device 203 such that, using the information of the agents, the computing device 203 may send batches of data from the storage 210 to the server 202 and may identify which agents are tasked to handle the batches of data. The new containers may be deployed by providing their information to the computing device 203 such that, using the information of the new containers, the computing device 203 may send batches of data from the storage 210 to the server 202 and may identify which containers responsible for handling the batches of data. An intermediate load balancing server may be used to balance batch job requests from the computing device 203 by directing the batch job requests to available agents/containers. The intermediate load balancing server may monitor the status of the agents, as reported to the storage 206, to ensure the batch job requests are being sent to currently available agents or containers.

To assist with explanation of the concepts described here, the disclosure includes the following sections: Securely Rehydrating Agents and Containers; Container-based Environments with Scalable Services; and Processes for Rehydration.

Securely Rehydrating Agents and Containers

Figure 3:
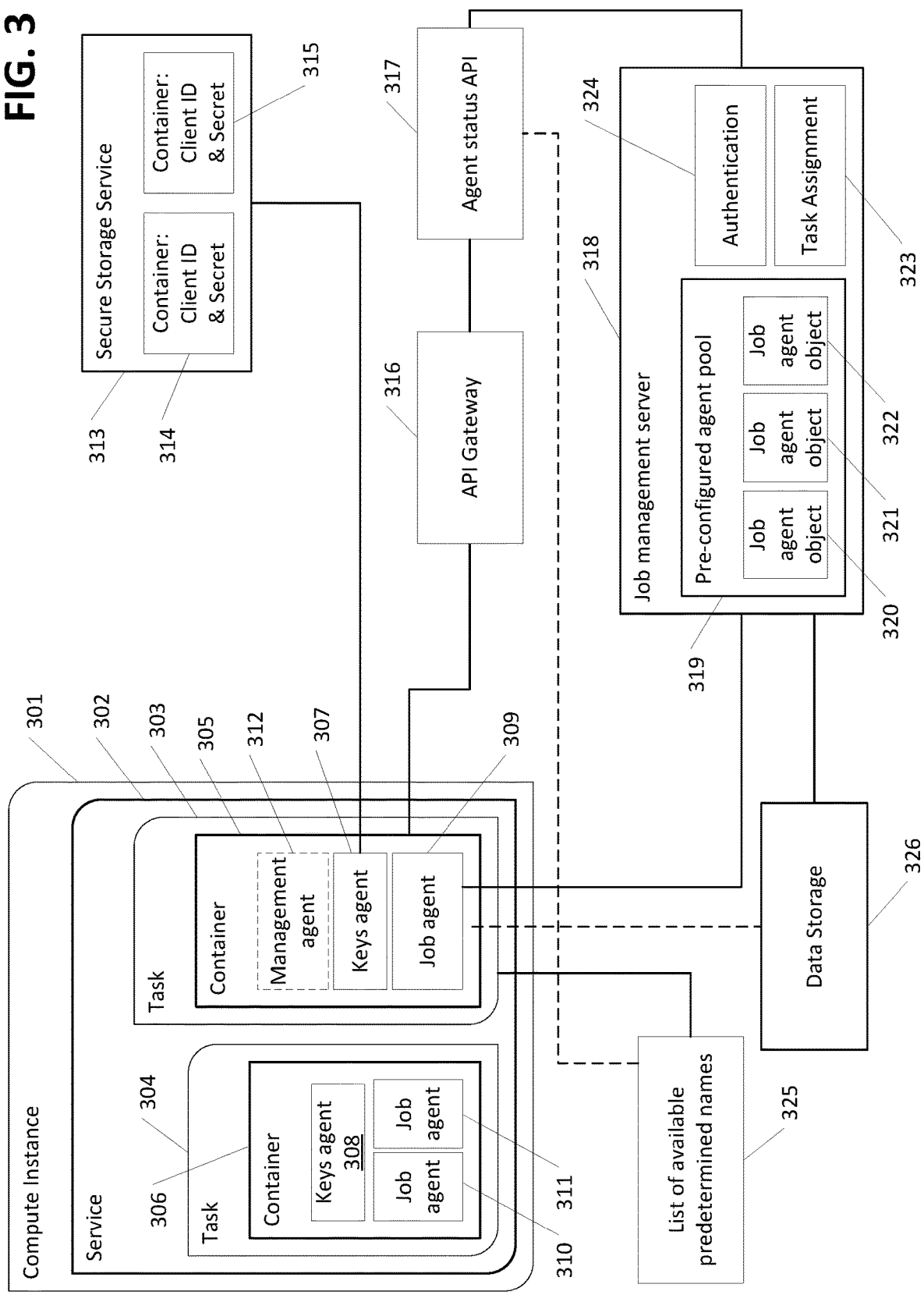
FIG. 3 depicts a network arrangement for instantiating agents in new containers in a secure storage service.

FIG. 3 depicts a diagram showing interactions between agent objects, agent instances, containers, and compute instances in a secure storage service. A cloud-based compute instance 301 is shown providing a service 302 using two or more tasks 303 and 304. Task 303 may be performed in container 305. Task 304 may be performed in container 306. Container 305 includes a keys agent instance 307 and a job agent instance 309. Container 306 may include a keys agent instance 308 and two job agent instances: a job agent instance 310 and a job agent instance 311. Each of keys agent instance 307 and key agent instance 308 may include one or more management functions that control the operations of job agent instance 309, job agent instance 310, or job agent instance 311. For example, a management function may include starting itself after instantiation of the container 305 or the container 306. Another management function may include controlling the operation of another agent or agents. In one or more examples, the agent instances and agent objects may be collectively referred to herein as "agents" as agent instances may be preconfigured and be provided with a predetermined name.

In some examples, these management functions may be performed by a separate management agent, e.g., shown in FIG. 3 as a management agent 312 shown inside container 305. Management agent 312 may manage operations performed in container 305. Container 306 may contain its own management agent (not shown) or may be managed by a management agent located outside container 306.

Keys agents 307 and 308 may be configured to support various security features of containers 305 and 306, respectively. For instance, keys agents 307 and 308 may store or have access to login information (e.g., a name and password) that permit access to a secure storage service 313. The secure storage service 313 may include, for container 305, a client identification (e.g., a client ID) and a secret key set 314. The client ID may be the name of the container (e.g., the container's name) or may be another reference that identifies the container, either uniquely among all containers in all clusters or relatively in the compute instance in a given cluster.

The secure storage service 313 may also include, for container 306, a client ID and a secret key set 315. Upon startup or otherwise when a job agent instance (e.g., job agent 309) needs to be instantiated, the key agent 307 may request, using its login information, the client ID and secret key set 314 from the secure storage service 313. In response, the secure storage service 313 may provide the client ID and secret key set 314 for container 305 to the keys agent 307. Using the client ID and secret key set 314 for container 305, the keys agent 307 may obtain an access token from a token exchange server, e.g., an API gateway 316. The access token may be of various forms including, for instance, a limited duration access token using the open standard OAuth (e.g., OAuth 2.0). In general, OAuth provides clients a secure delegated access to server resources on behalf of a resource owner. OAuth describes a process for resource owners to authorize third-party access to their server resources without providing credentials. Using a separate authorization server, OAuth permits third-party clients to obtain access tokens, which may be used to access protected resources hosted by a resource server of the resource owner. A benefit of storing the client ID and secret key sets 314 and 315 separate from the containers themselves may include enhancing the security of the overall system while making it easier for developers to quickly change the client ID and secret key sets 314 and 315 as needed.

Once the keys agent 307 has obtained the access token from the token exchange server, e.g., the API gateway 316, the keys agent 307 (or other management agent 312) may use the token to securely access information to determine whether a job agent instance 309 needs to be instantiated and the information needed to instantiate the job agent instance 309. For example, the keys agent 307 (or other management agent 312) may use a secure application programming interface API 317, via the token exchange server, e.g., the API gateway 316, to access content stored in a job management server 318. The job management server 318 may include a pre-configured agent pool 319 that includes pre-configured job agent objects 320, 321, and 322. The pre-configured job agent objects 320, 321, and 322 may include per-container configuration information or may be agent objects of various types with at least some configuration information relating to the tasks they are to perform. For instance, the at least some configuration information may include where to send completed task data or from where the agent is to expected to receive task assignments. Once associated with a container and selected name, the job agent object 320 (or job agent objects 321 or 322) may be deployed to the container.

In various aspects, job agent instances 309, 310, or 311 may have predetermined names. Using the predetermined names and knowledge of which containers 305 or 306 have been deployed, the job management server 318 may be configured to interact with the job agent instances 309, 310, or 311. For example, the job management server 318 may expect job agent instances 309, 310, or 311 associated with the predetermined names to be active. Having predetermined names may permit management of new containers to become more efficient, from the perspective of the job management server 318 already knows what the agent identifications are (but not whether the agent instances currently exist). In some examples, the job agent instances 309, 310, or 311 may be named once deployed and the new names reported to the job management server 318. In this latter approach, the job management server 318 may further include a name mapping table that provides the specific name for a given agent instance to permit the job management server 318 to be able to address jobs to the specific agent instance.

To support the use of predetermined names, the system may include a server that provides a list 325 of available preconfigured names of agent instances. The list 325 may be stored on its own server or as part of another server or in data storage. The keys agent 307 may obtain the list 325 and select an available preconfigured name for a new agent instance to be instantiated in container 305. In some examples, it may obtain a complete list of names of agent instances for a container and determine which agent instance is not instantiated. With the name of the un-instantiated agent instance known, the keys agent 307 may request the specific job agent object (e.g., job agent object 320) from the pre-configured agent pool 319. The keys agent 307 may obtain the list 325 directly from the server storing the list 325 or may obtain the list 325 using the API 317 with the access token as shown in broken lines. In other examples, a management agent 312 may request the specific job agent using the token obtained by the keys agent 307.

In one or more examples where the names of the job agent instances are predefined and only one job agent instance may exist at a time with a given predetermined name, the pre-configured job agent objects 320, 321, and 322 may be understood to be pre-configured agent instances as only one instance of the pre-configured job agent objects 320, 321, and 322 may exist at a time. For example, a pre-configured job agent may exist in the pre-configured agent pool 319, in container 305, or in container 306. In other examples where the names of the job agent instances are predetermined but relate to a smaller group of job agent objects, the pre-configured agent pool 319 may store pre-configured job agent objects that are instantiated, in containers, as different job agent instances, where each job agent instance has one of the predetermined names and where the predetermined names are unique.

The job management server 318 may rely on another server to provide authentication of the token from the key agent 307. In some examples, the job management server 318 may include its own authentication process 324. As processing tasks are received, the job management server 318 may assign the tasks via a task assignment process 323. The task assignment process may comprise a load balancing server or other load balancing operation that attempts to distribute processing loads across the active containers. The data for processing may be obtained from and/or returned to data storage 326. In some examples, the container 305 may obtain processing jobs directly from the data storage 326.

Figure 4:
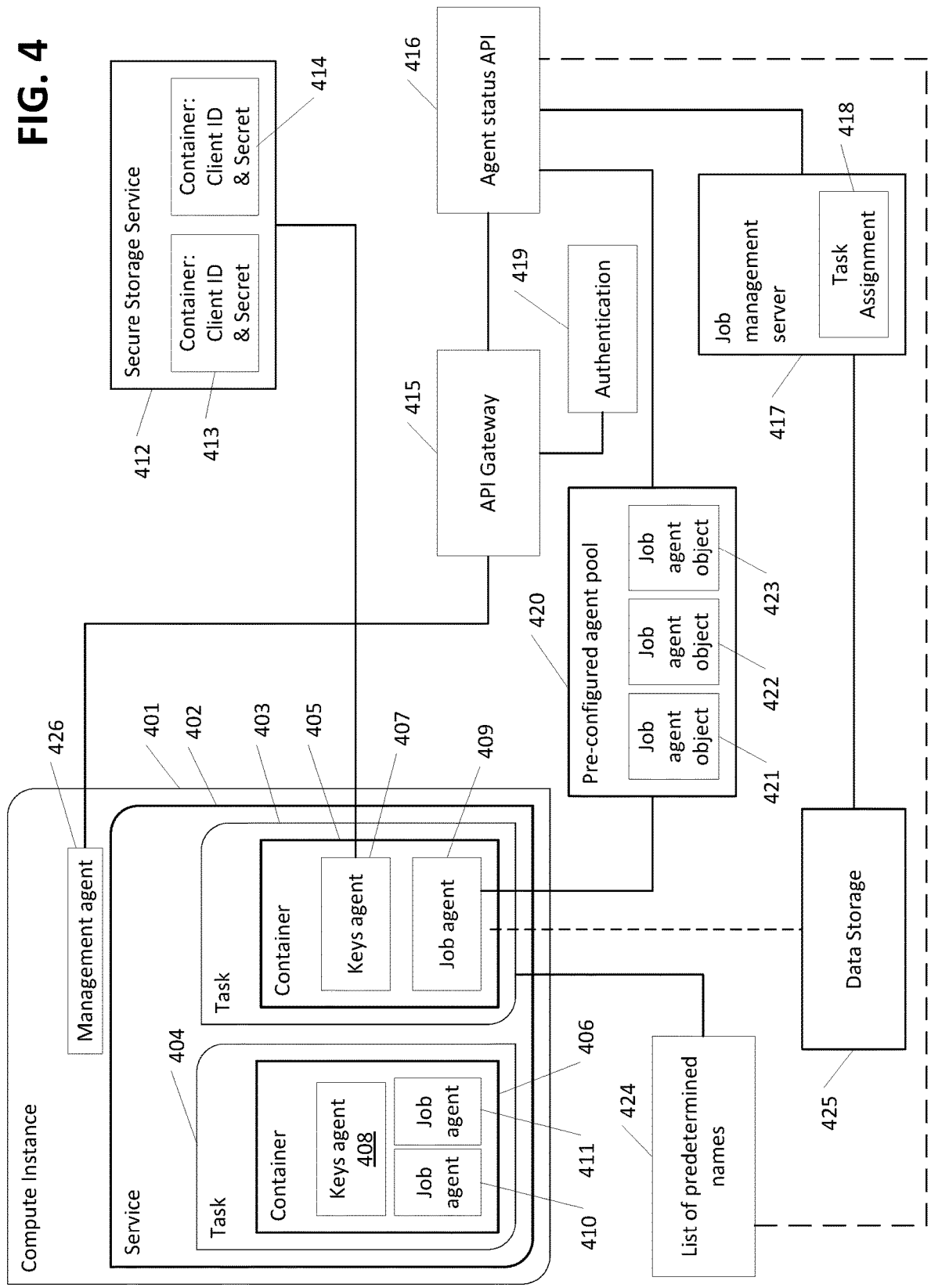
FIG. 4 depicts a network arrangement for instantiating agents in new containers in a secure storage service.

FIG. 4 shows another diagram showing interactions between agent objects, agent instances, containers, and compute instances in a secure storage service. A cloud-based compute instance 401 is shown providing a service 402 using two or more tasks 403 and 404. Task 403 may be performed in container 405. Task 404 may be performed in container 406. Container 405 includes a keys agent 407 and a job agent instance 409. Container 406 may include a keys agent 408 and two job agents: a job agent instance 410 and a job agent instance 411. Each of keys agent 407 and key agent 408 may include one or more management functions that control the operations of job agent instance 409, job agent instance 410, or job agent instance 411. For example, a management function may include starting itself after instantiation of the container 405 or the container 406. Another management function may include controlling the operation of another agent or agents.

In some examples, these management functions may be performed by a separate management agent, e.g., shown in FIG. 4 as a management agent 426 external to each of containers 405 and 406. Management agent 426 may manage operations performed in the containers within the compute instance 401.

Keys agents 407 and 408 may be configured to support various security features of containers 405 and 406, respectively. For instance, keys agents 407 and 408 may store or have access to login information (e.g., a name and password) that permit access to a secure storage service 412. The secure storage service 412 may include, for container 405, a client identification (e.g., a client ID) and a secret key set 413. The secure storage service 412 may also include, for container 406, a client ID and a secret key set 414. Upon startup or otherwise when a job agent instance (e.g., job agent instance 409) needs to be instantiated, the key agent 407 may request, using its login information, the client ID and secret key set 413 from the secure storage service 412. In response, the secure storage service 412 may provide the client ID and secret key set 413 for container 405 to the keys agent 407. Using the client ID and secret key set 413 for container 405, the keys agent 407 may obtain an access token from a token exchange server, e.g., an API gateway 415. The access token may be of various forms including, for instance, a limited duration access token using the open standard OAuth (e.g., OAuth 2.0). A benefit of storing the client ID and secret key sets 413 and 414 separate from the containers themselves may include enhancing the security of the overall system while making it easier for developers to quickly change the client ID and secret key sets 314 and 315 as needed.

Once the keys agent 407 has obtained the access token from the token exchange server, e.g., the API gateway 415, the keys agent 407 (or other management agent 426) may use the token to securely access information to determine whether a job agent instance 409 needs to be instantiated and the information needed to instantiate the job agent instance 409. For example, the keys agent 407 (or other management agent 426) may use a secure agent status API 416, via the token exchange server, e.g., the API gateway 415, to access an agent instance's status stored in a job management server 417. In some examples, an agent instance's status may be stored elsewhere, e.g., in a pre-configured agent pool 420. As shown in FIG. 4, a pre-configured agent pool 420 may be provided separately from the job management server 417. The pre-configured agent pool 420 may include pre-configured job agent objects 421, 422, and 423 having per-container configuration information. In some examples, the pre-configured job agent objects 421, 422, and 423 may be agent objects of various types with at least some configuration information relating to the tasks they are to perform. For instance, the at least some configuration information may include where to send completed task data or from where the agent is to expected to receive task assignments. Once associated with a container and selected name, the job agent object 421 (or job agent objects 422 or 423) may be deployed to the container.

In various aspects, job agent instances 409, 410, or 411 may have predetermined names. Using the predetermined names and knowledge of which containers 405 or 406 have been deployed, the job management server 417 may be configured to interact with the job agent instances 409, 410, or 411 as the job management server 417 expects the job agent instances 409, 410, or 411 associated with the predetermined names to be active. Having predetermined names makes management of new containers more efficient, from the perspective of the job management server 417 already knows what the agent identifications are (but not whether the agent instances currently exist). In some examples, the job agent instances 409, 410, or 411 may be named once deployed and the new names reported to the job management server 417. In this latter approach, the job management server 417 may further include a name mapping table that provides the specific name for a given agent instance to permit the job management server 417 to be able to address jobs to the specific agent instance.

To support the use of predetermined names, the system may include a server that provides a list 424 of available preconfigured names of agent instances. The list 424 may be stored on its own server or as part of another server or in data storage. The keys agent 407 may obtain the list 424 and select a name of an un-instantiated instance for container 405. In some examples, the keys agent 407 may obtain a complete list of names of agent instances for a container and determine which agent instance is not instantiated. With the name of the un-instantiated agent instance known, the keys agent 407 may request the specific job agent object (e.g., job agent object 421) from the pre-configured agent pool 420. The keys agent 407 may obtain the list 424 directly from the server storing the list 424 or may obtain the list 424 using the API 416 with the access token as shown in broken lines.

In one or more examples where the names of the job agent instances are predefined and only one job agent instance may exist at a time with a given predetermined name, the pre-configured job agent objects 421, 422, and 423 may be understood to be pre-configured agent instances as only one instance of the pre-configured job agent objects 421, 422, and 423 may exist at a time. For example, a pre-configured job agent may exist in the pre-configured agent pool 420, in container 405, or in container 406. In other examples where the names of the job agent instances are predetermined but relate to a smaller group of job agent objects, the pre-configured agent pool 420 may store pre-configured job agent objects that are instantiated, in containers, as different job agent instances, where each job agent instance has one of the predetermined names and where the predetermined names are unique.

The job management server 417 may rely on another server to provide authentication of the token from the key agent 407. For instance, a centralized authentication process 419 may be included as attached to the API gateway 415. As processing tasks are received, the job management server 417 may assign the tasks via a task assignment process 418. The task assignment process may comprise a load balancing server or other load balancing operation that attempts to distribute processing loads across the active containers. The data for processing may be obtained from and/or returned to data storage 425. In some examples, the container 405 may obtain processing jobs directly from the data storage 425.

Container-Based Environments with Scalable Services

Figure 5:
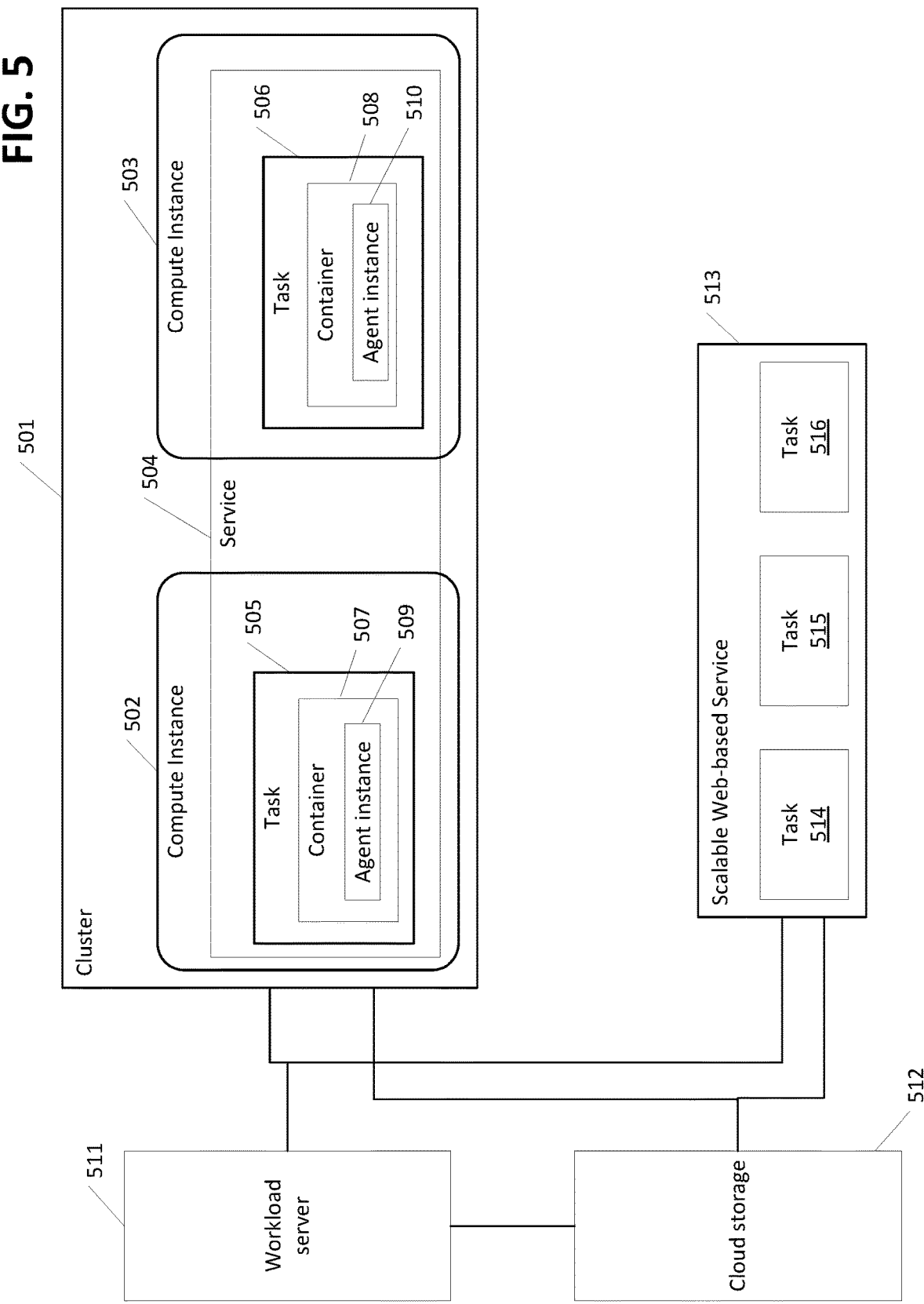
FIG. 5 depicts relationships between a container service and a scalable web-based service.

FIG. 5 shows relationships between a scalable service and an elastic container service. A cluster 501 may contain a quantity of compute instances 502 and 503. Together the compute instances may provide one or more services 504. Each compute instance 502 or 503 may provide a task 505 or 506 as part of the service 504. Each task 505 or 506 may be performed by respective applications running in a container 507 or 508. The containers 507 or 508 (and applications running in them) may be managed by one or more container agents 509 or 510.

The cluster 501 may be connected with a workload server 511, a cloud storage 512, a scalable web-based service 513 (with one or more scalable tasks 514, 515, and 516), or combination of components of FIG. 2. The workload server 511 may use the service 504 provided by the cluster 501, such as by sending data to be processed using one or more tasks 505 or 506. Which individual container 507 or 508 that handles the task for the incoming data may be decided by the workload server 511, by the container agent 509 or 510, by the scalable web-based service 513, and/or other server (e.g., a load balancing server or servers—not shown in FIG. 5).

Processes for Rehydration

Figure 6:
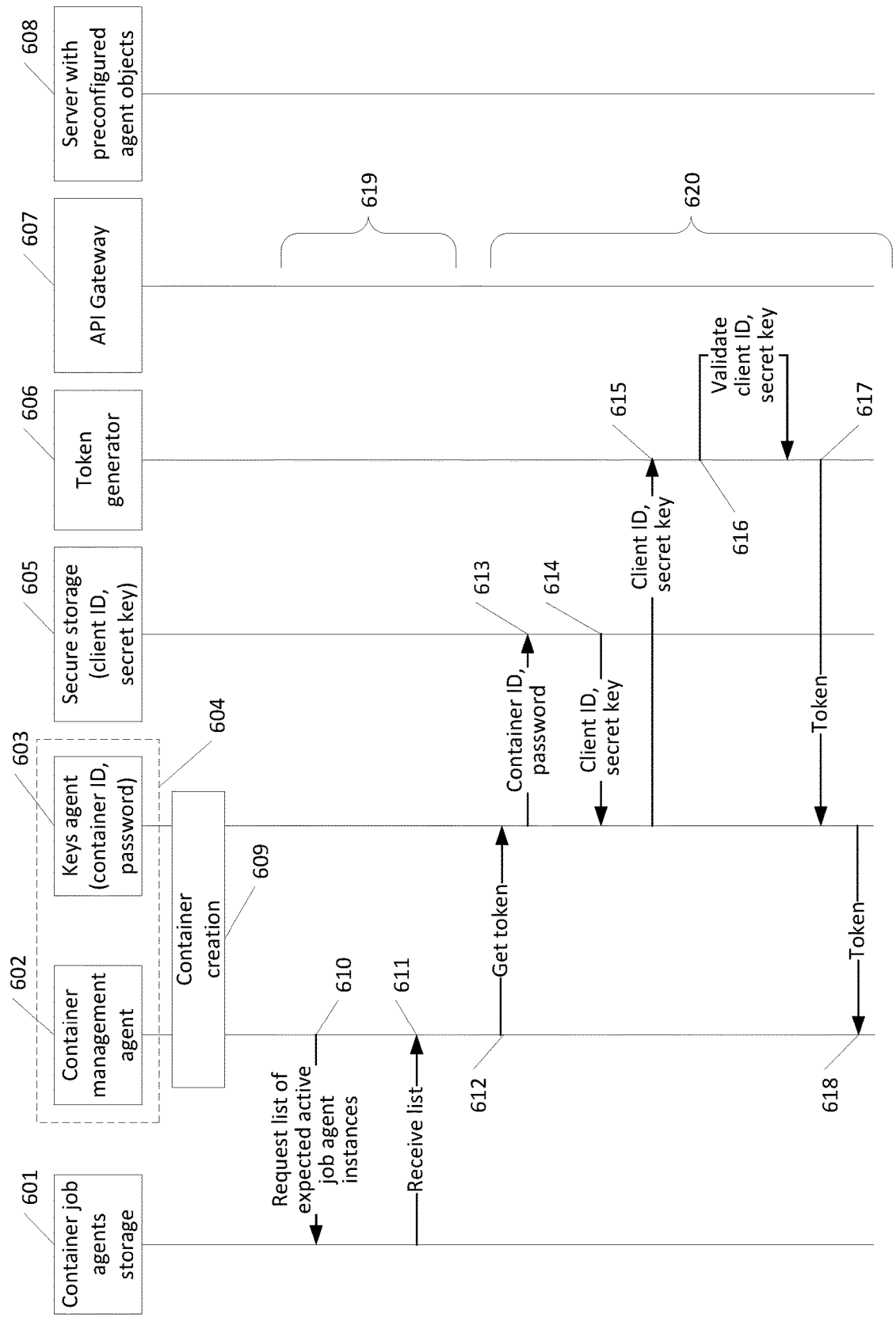
FIG. 6 depicts a process for obtaining tokens for accessing secure agent objects.

FIG. 6 depicts a process for obtaining tokens for accessing secure agent objects. FIG. 6 shows a container job agents storage 601 that includes a list of job agents that are supposed to be active in containers, a container management agent 602, and a keys agent 603. The keys agent 603 may store a container identification and password. The container management agent 602 and keys agent 603 may comprise a combined agent 604 or may comprise two or more separate agents. FIG. 6 further comprises a secure storage 605 configured to store a client ID and a secret key. The client ID and secret key in secure storage 605 may be accessed via a correct container ID and password from the keys agent 603 or the combined agent 604. FIG. 6 further shows a token generator 606 that may generate a token based on receiving a valid client ID and secret key. FIG. 6 further shows an application programming interface gateway 607 and a server 608 with preconfigured agent objects.

When a container is newly created in step 609 or when periodically checking that all agents in a container are active, the container management agent 602 (or the combined agent 604) may request in step 610, from the container job agents storage 601, a list of active job agent instances. The request may be specific to a given container, specific to a compute instance, or encompass a cluster. If not specific to a container, the container management agent 602 may filter the list of active job agent instances to those of a given container. In step 611, the list of active job agent instances may be received. For instance, the container management agent 602 may filter the received list to the given container or the list may be used without filtering. In step 612, the container management agent 602 may instruct, the keys agent 603 (if separate from the container management agent 602) to get a token. The keys agent 603 may be responsible for obtaining tokens for a specific container or may be responsible for obtaining tokens for multiple containers. In step 613, the keys agent 603 may send the container ID and password to the secure storage 605. The secure storage 605 may compare the received container ID and password with a secure list of container IDs and corresponding passwords. If the received container ID and password match the secure list, then the secure storage 605 may generate a client ID and secret key and send, in step 614, the client ID and secret key to the keys agent 603 (or combined agent 604). The keys agent 603 may send in step 615 the client ID and secret key to the token generator 606. The token generator may validate, in step 616, the received client ID and secret key. Based on a successful validation, the token generator may generate a token for the keys agent 603. The token may be an OAuth 2.0 token or the like. Other authentication methods may be used. In step 617, the token generator may return the generated token to the keys agent 603. The token generator 606 may send the generated token to the keys agent 603 via a return path of an API call from the keys agent 603. In another example, the token generator may send the generated token to the keys agent 603 via a directed message or other messaging pathway. In step 618, if the container management agent is separate from the keys agent 603, the keys agent 603 may send the token to the container management agent 602. If the container management agent 602 is not separate from the keys agent 603 but combined as combined agent 604, the combined agent 604 may have possession of the token from the token generator 606. FIG. 6 shows an example where the determination of whether a job agent instance needs to be instantiated (collectively steps 619) is performed before a token is obtained (collectively steps 620). In another example, the token may be obtained (steps 620) before the determination of whether an agent instance is to be instantiated (steps 619).

Figure 7:
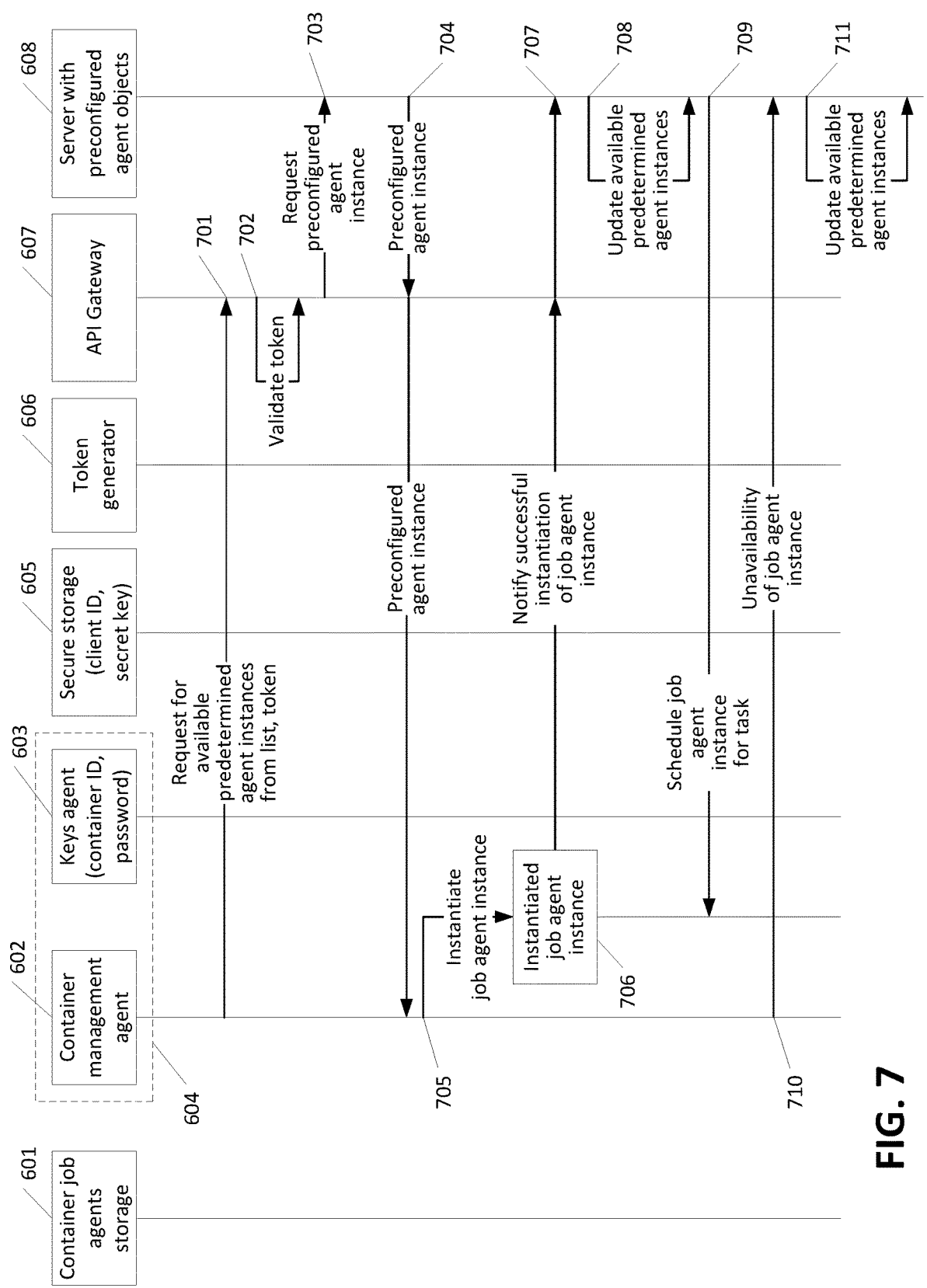
FIG. 7 depicts a process for using agent objects to instantiate agents.

FIG. 7 depicts a process for using agent objects to instantiate agents. The container job agents storage 601, the container management agent 602, the keys agent 603 (or possible combined agent 604), the secure storage 605, the token generator 606, the API gateway 607, and the server 608 with the preconfigured agent objects may be similar to those described above with respect to FIG. 6. FIG. 7 differs from FIG. 6 as FIG. 7 generally relates to use of the token obtained in FIG. 6. In step 701, the container management agent 602 may send, to the API gateway 607, the token and the agent ID of the agent to be instantiated. In step 702, the API gateway may validate the token. Based on a successful validation, the request for the pre-configured agent instance or instances is sent, in step 703, to the server 608 with the preconfigured agent objects. In one or more examples, the agent ID may identify the agent instance (or an agent object related to the agent instance) to be instantiated (e.g., in the new container). The token may have a limited lifespan, e.g., 20 minutes or so. Longer or shorter lifespans may be used as desired. The server 608 or collection of servers may identify the relevant agent object corresponding to the agent instance identified by the agent ID from the collection of preconfigured agent objects. In step 703, the server or collection of servers may send, in step 704, the specific pre-configured agent object (or pre-configured agent instance) (corresponding to the agent ID from the container management agent 602) to the container management agent 602, via the API gateway 607. The server or servers may send the specific agent object via a return path of an API call that the container management agent 602 used to send the token to the API gateway 607. In another example, the server or servers may send the specific agent object to the container management agent 602 via a directed message or other messaging pathway. The container management agent 602 may instantiate, in step 705, the job agent instance 706 with the preidentified name and pre-configured agent. For example, the unused name may be an available name that is not being used in the compute instance. In some examples, the unused name may be an available name that is not being used in the cluster.

In step 707, the server 608 may be notified, via API gateway 607, that the job agent instance 706 has been successfully instantiated. In step 708, the server 608 may update the available predetermined agent objects/agent instances to remove, from the list of available agents, the newly instantiated job agent instance 706.

In step 709, the server 608 may schedule the new job agent instance 706 for handling tasks performed in the container.

If an instantiated agent becomes disabled or a container with the agent is closed, the server monitoring the list of available predetermined agent instance names may be notified in step 710 to indicate that the predetermined agent instance name is available again (and the list subsequently updated in step 711). The notification may come from the container management agent 602 in the container, a compute instance associated with the container, or may be determined separately based on a lack of communication from the job agent instance or container.

Figure 8:
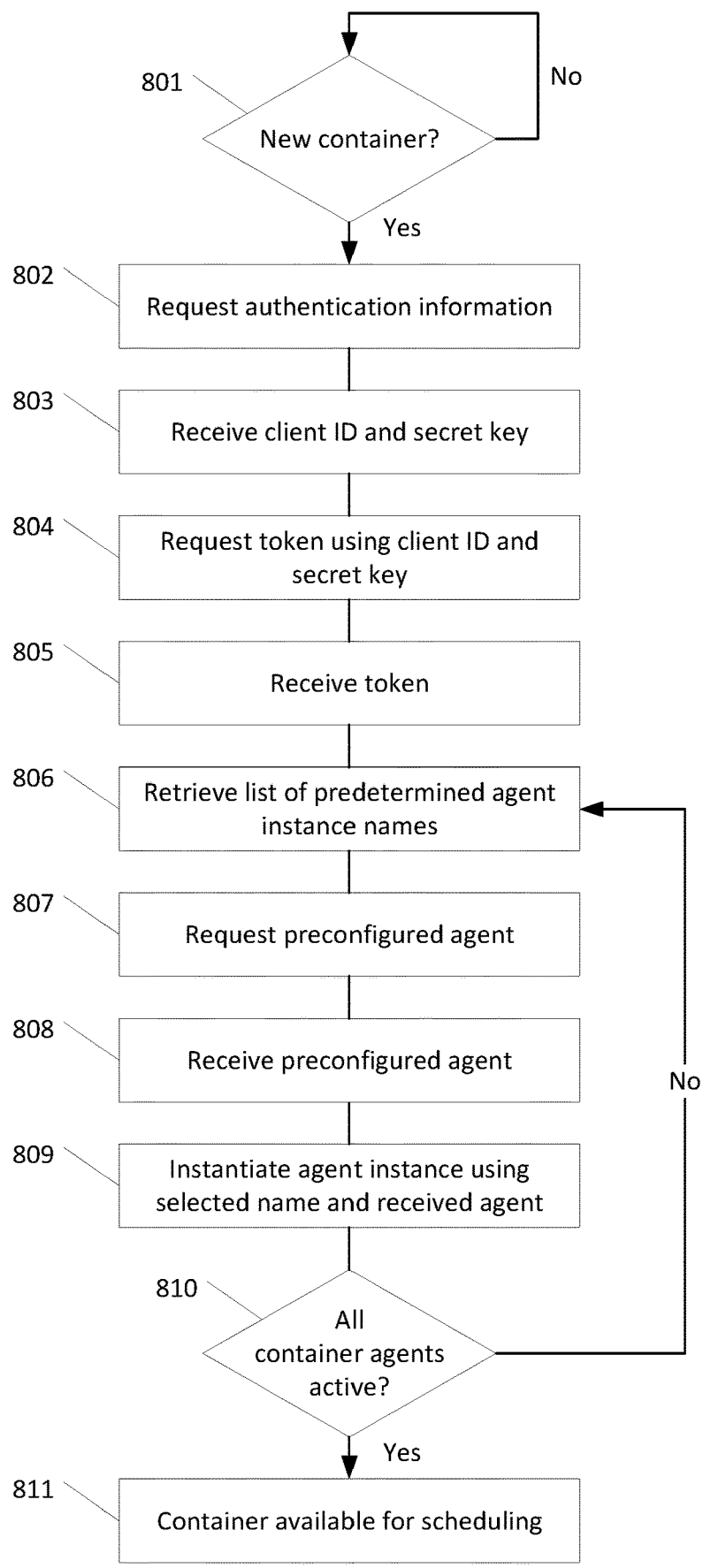
FIG. 8 depicts a process for instantiating agents in new containers.

FIG. 8 depicts a process for instantiating job agents in new containers. In step 801, the process may monitor for creation of a new container. If no new container has been created, step 801 may repeat until a new container has been created. For example, a list of active containers for a compute instance may be stored. As a new container is added to the list of active containers, step 801 may determine that a new container has been created. Upon creation of new container (the "yes" branch from step 801), the process, in step 802, may request authentication information from a secure storage. Step 802 may include a keys agent obtaining a container ID and password as the authentication information. The container ID and password may have been previously stored with the keys agent or may be stored elsewhere. The keys agent may send, as the request of step 802, the container ID and password to a remote secure storage. In response to the request for the authentication information in step 802, the remote secure storage may compare the container ID and password against a list of known container IDs and their associated passwords. If a match is found, the remote secure storage may send a client ID and secret key to the keys agent, where the keys agent receives the client ID and secret key in step 803. In step 804, the process (e.g., via the keys agent) may request a token from a token server using the client ID and secret key. The token server may compare the received client ID and secret key against a list of known client IDs and secret keys. Upon finding a match, the token server may generate a limited duration token and send it to the keys agent. In step 805, the token may be received by the keys agent. The token server may send the token to the keys agent via a return path of an API call that the keys agent used to send the client ID and secret key to the token server. In another example, the token server may send the generated token to the keys agent via a directed message or other messaging pathway. The token may be sent to a server or servers maintaining a list of available agent instance names. In other examples, other authentication information may be sent to the server or servers to authenticate the keys agent or a container agent to the server or servers maintaining the list of available agent instance names. The authentication information or token may be send through an API or other pathway.

In step 806, the keys agent, a container agent, or a combined agent may retrieve a list of predetermined agent instance names expected to be running in the container. The retrieval of step 806 may include a server or servers maintaining the list of available agent instance names receiving and authenticating the token or other authentication information from the container agent or keys agent and, upon authentication, sending the list of agent names expected to be active in the container. Where the server or server is in the same security environment as the container agent or combined agent, the authentication process may not be performed. The server or servers maintaining the list of available predetermined agent instance names may send the list of expected agents to be active to the container agent or combined agent via a return path of an API call (e.g., that the container agent used to send the token) via a directed message or other messaging pathway.

For any agent instance that is in the received list but is not active in the container, the container agent may, in step 807, request the preconfigured agent from an agent server, e.g., using the predetermined agent name and the token. The request may be sent via an API (or other pathway) using the token or with other authentication information. A server managing preconfigured agent objects may receive the token or other authentication information and authenticate the token or other authentication information. The server managing preconfigured agent objects may obtain the matching preconfigured agent object. The server managing preconfigured agent objects may send, in step 808, the preconfigured agent object to the container agent via a return path of an API call that the container agent used to send the token to the server managing preconfigured agent objects. In another example, the server managing preconfigured agent objects may send the preconfigured agent object to the container agent via a directed message or other messaging pathway.

In step 809, the job agent instance may be instantiated, by the container agent, using the received preconfigured agent object and identified with the selected name. The container agent may instantiate the new agent instance in the new container. In other examples, the container agent may instantiate the new agent instance in an existing container where a previous version of the agent instance became inactive or was otherwise unavailable. In step 810, the container agent may determine whether all container job agents identified in the list from step 806 are active. If less then all job agents are active, then the process returns to step 806 and a preconfigured job agent, corresponding to another inactive job agent, is requested from the server storing the preconfigured job agents. In step 812, the job agent may be scheduled to handle tasks performed in the container. For example, the container may be deployed as part of the service 302, service 402, or service 504 as described herein. The job agent may be made available for handling tasks from a workload server (e.g., workload server 511). if all job agents for the container are active, step 802 may repeat until a job agent becomes inactive. Steps 801 and 802 are shown as step 802 occurring after step 801. It is appreciated that steps 801 and 802 may be reversed. In further examples, steps 801 and 802 may be performed in parallel.

In accordance with one or more aspects, a computer-implemented method may provide a benefit of instantiating agents in containers in which tasks are performed by the instantiated agents. In accordance with one or more aspects, a computer-implemented method may provide a benefit of instantiating agents in containers in which tasks are performed by the instantiated agents. The computer-implemented method may include receiving, for a container, container configuration information that may include a container name and one or more agent identifications associated with one or more agent instances expected to be active in the container; receiving one or more agent identifications of one or more active agent instances having been instantiated in the container; identifying, based on a comparison between the container configuration information and the one or more agent identifications of the one or more active agent instances, an agent identification of a non-instantiated agent instance; and sending, to an authentication process and based on the identification of the agent identification of the non-instantiated agent, a client identification and a password. The computer-implemented method may further include receiving, based on the client identification and the password, an access token; sending, with the access token and based on the identification of the agent identifications of the non-instantiated agent, a request for a preconfigured agent object, wherein the request may include the agent identification of the non-instantiated agent; and receiving, based on the request, the preconfigured agent object associated with the agent identification of the non-instantiated agent. The computer-implemented method may further include instantiating, based on the preconfigured agent object, a new agent instance; and scheduling performance, based on the instantiation of the new agent instance, of a task by the new agent instance. In one or more aspects, the new agent instance may be associated with the container and/or the first predetermined agent instance name.

In further aspects, the names of all instantiated agent instances may have been predetermined. In other aspects, exactly one name may have been received. In other aspects, the first predetermined agent instance name and other names may have been received and the method then selecting from the received names.

In some aspects, the method may further include sending, via an agent status application programming interface (API), the one or more agent identifications of one or more active agent instances having been instantiated in the container. The method may also include sending, via an agent status API and based on the instantiation of the new agent instance, a status of the new agent instance associated with the first predetermined agent instance name. The method may further include determining, based on a determination that the container has been deployed, whether at least one agent instance associated with the container is inactive; and obtaining, based on a determination that the at least one agent instance is inactive, agent instance information for the inactive at least one agent instance. The request may be sent based on the obtained agent instance information.

In some examples, identifying the agent identification of the non-instantiated agent may comprise selecting a first predetermined non-instantiated agent from a plurality of non-instantiated agents. In some examples, the method may further comprise sending, via an agent status application programming interface (API), the one or more agent identifications of one or more inactive agent instances. In some examples, the method may further comprise sending, via an agent status API and based on the instantiation of the new agent instance, a status of the new agent instance. In some examples, the method may further comprise determining, based on a determination that the container has been deployed, whether at least one agent instance associated with the container is inactive; and obtaining, based on a determination that the at least one agent instance is inactive, agent instance information for the inactive at least one agent instance. The sending the request for the preconfigured agent object may be further based on the obtained agent instance information. In some examples, sending the client identification and the password may further comprises sending, via a management agent associated with the container, the client identification and the password. In some examples, sending the client identification and the password may further comprises sending, via a management agent associated with a compute instance, the client identification and the password. The compute instance may comprise the container and at least one additional container.

In one or more aspects, an apparatus for instantiating agents in containers may provide the benefit of performing tasks by the instantiated agents. The apparatus may include one or more processors and memory storing instructions. When executed by the one or more processors, the instructions may cause the apparatus to receive, for a container, container configuration information that may include a container name and one or more agent identifications associated with one or more agent instances; receive one or more agent identifications of one or more active agent instances having been instantiated in the container; identify, based on a comparison between the container configuration information and the one or more agent identifications of the one or more active agent instances, an agent identification of a non-instantiated agent; and send, to an authentication process and based on an identification of the agent identification of the non-instantiated agent, a client identification and a password. The instructions may further cause the apparatus to receive, based on the client identification and the password, an access token and send, with the access token and based on the identification of the agent identifications of the non-instantiated agent, a request for a preconfigured agent object. The request may include the agent identification of the non-instantiated agent. The instructions may further cause the apparatus to receive, based on the request, the preconfigured agent object associated with the agent identification of the non-instantiated agent; send, to an agent name repository and based on the identification of the agent identification of the non-instantiated agent, a request for an available predetermined agent instance name; receive, from the agent name repository and based on the request for the available predetermined agent instance name, a first predetermined agent instance name; instantiate, based on the first predetermined agent instance name and the preconfigured agent object, a new agent instance, wherein the new agent instance may be associated with the container, and wherein the new agent instance may be associated with the first predetermined agent instance name; and perform, based on the instantiation of the new agent instance associated with the first predetermined agent instance name, a task by the new agent instance. The names of all instantiated agent instances may have been predetermined.

In some aspects, the instructions to receive the first predetermined agent instance name may further cause the apparatus to receive exactly one name. In some aspects, the instructions to receive the first predetermined agent instance name may further cause the apparatus to receive, as available names, the first predetermined agent instance name and additional predetermined agent instance names; and select the first predetermined agent instance name.

In some aspects, the instructions may further cause the apparatus to send, via an agent status application programming interface (API), the one or more agent identifications of one or more active agent instances having been instantiated in the container. In some aspects, the instructions may further cause the apparatus to send, via an agent status API and based on the instantiation of the new agent instance, a status of the new agent instance associated with the first predetermined agent instance name. In some aspects, the instructions may further cause the apparatus to determine, based on a determination that the container has been deployed, whether at least one agent instance associated with the container is inactive; and obtain, based on a determination that the at least one agent instance is inactive, agent instance information for the inactive at least one agent instance. The request for the preconfigured agent object may be further based on the obtained agent instance information.

In some aspects, the instructions to send the client identification and the password may further cause the apparatus to send, via a management agent associated with the container, the client identification and the password.

In further aspects, the compute instance may be instantiated in the memory of the apparatus, the compute instance may include a management agent and a task, the task may include the container, and/or the instructions to determine whether the container has been deployed cause the management agent to determine whether the container has been deployed.

In yet further aspects, a compute instance may be instantiated in the memory of the apparatus, the compute instance may include a task, the task may include the container, the container may include a management agent and one or more job agents, and/or the instructions to determine whether the container has been deployed cause the management agent to identify when the container has been recently deployed.

In further aspects, one or more non-transitory computer-readable media may store instructions that, when executed by one or more processors, may cause the one or more processors to perform steps including receiving, for a container, container configuration information that may include a container name and one or more agent identifications associated with one or more agent instances expected to be active in the container; receiving one or more agent identifications of one or more active agent instances having been instantiated in the container; identifying, based on a comparison between the container configuration information and the one or more agent identifications of the one or more active agent instances, an agent identification of a non-instantiated agent instance; and sending, to an authentication process and based on the identification of the agent identification of the non-instantiated agent, a client identification and a password. The computer-implemented instructions may cause the one or more processors to perform further steps comprising receiving, based on the client identification and the password, an access token; sending, with the access token and based on the identification of the agent identifications of the non-instantiated agent, a request for a preconfigured agent object, wherein the request may include the agent identification of the non-instantiated agent; and receiving, based on the request, the preconfigured agent object associated with the agent identification of the non-instantiated agent. The computer-implemented instructions may cause the one or more processors to perform further steps comprising instantiating, based on the preconfigured agent object, a new agent instance; and scheduling performance, based on the instantiation of the new agent instance, of a task by the new agent instance. In one or more aspects, the new agent instance may be associated with the container and/or the first predetermined agent instance name.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for instantiating agents in containers, wherein tasks are performed by the instantiated agents, the method comprising:
receiving, for a container, container configuration information comprising:
  a container name; and
  one or more agent identifications associated with one or more agent instances;
receiving one or more agent identifications of one or more active agent instances having been instantiated in the container;
identifying, based on a comparison between the container configuration information and the one or more agent identifications of the one or more active agent instances, an agent identification of a non-instantiated agent;

sending, to an authentication process and based on an identification of the agent identification of the non-instantiated agent, a client identification and a password;

receiving, based on the client identification and the password, an access token;

sending, with the access token and based on the identification of the agent identifications of the non-instantiated agent, a request for a preconfigured agent object, wherein the request comprises the agent identification of the non-instantiated agent;

receiving, based on the request, the preconfigured agent object associated with the agent identification of the non-instantiated agent;

instantiating, based on the preconfigured agent object, a new agent instance, wherein the new agent instance is associated with the container; and scheduling performance, based on the instantiation of the new agent instance, of a task by the new agent instance.

2. The computer-implemented method of claim 1, wherein names of all instantiated agent instances are predetermined.

3. The computer-implemented method of claim 1, wherein receiving the container configuration information further comprises:
    receiving exactly one agent identification.

4. The computer-implemented method of claim 1, wherein identifying the agent identification of the non-instantiated agent comprises:
    selecting a first predetermined non-instantiated agent from a plurality of non-instantiated agents.

5. The computer-implemented method of claim 1, further comprising:
    sending, via an agent status application programming interface (API), the one or more agent identifications of one or more inactive agent instances.

6. The computer-implemented method of claim 1, further comprising:
    sending, via an agent status API and based on the instantiation of the new agent instance, a status of the new agent instance.

7. The computer-implemented method of claim 1, further comprising:
    determining, based on a determination that the container has been deployed, whether at least one agent instance associated with the container is inactive; and
    obtaining, based on a determination that the at least one agent instance is inactive, agent instance information for the inactive at least one agent instance,
    wherein the sending the request for the preconfigured agent object is further based on the obtained agent instance information.

8. The computer-implemented method of claim 1, wherein the sending the client identification and the password further comprises:
    sending, via a management agent associated with the container, the client identification and the password.

9. The computer-implemented method of claim 1, wherein the sending the client identification and the password further comprises:
    sending, via a management agent associated with a compute instance, the client identification and the password,
    wherein the compute instance comprises the container and at least one additional container.

10. An apparatus for instantiating agents in containers, wherein tasks are performed by the instantiated agents having predetermined names, the apparatus comprising:
    one or more processors; and
    memory storing instructions that, when executed by the one or more processors, cause the apparatus to:
        receive, for a container, container configuration information comprising:
            a container name; and
            one or more agent identifications associated with one or more agent instances, wherein each agent identification comprises one of the predetermined names;
        receive one or more agent identifications of one or more active agent instances having been instantiated in the container;
        identify, based on a comparison between the container configuration information and the one or more agent identifications of the one or more active agent instances, an agent identification of a non-instantiated agent;
        send, to an authentication process and based on an identification of the agent identification of the non-instantiated agent, a client identification and a password;
        receive, based on the client identification and the password, an access token;
        send, with the access token and based on the identification of the agent identifications of the non-instantiated agent, a request for a preconfigured agent object, wherein the request comprises the agent identification of the non-instantiated agent;
        receive, based on the request, the preconfigured agent object associated with the agent identification of the non-instantiated agent;
        instantiate, based on the preconfigured agent object, a new agent instance, wherein the new agent instance is associated with the container; and
        schedule performance, based on the instantiation of the new agent instance, of a task by the new agent instance.

11. The apparatus of claim 10, wherein the instructions to receive the first predetermined agent instance name further cause the apparatus to:
    receive exactly one agent identification name.

12. The apparatus of claim 10, wherein the instructions to identify the agent identification of the non-instantiated agent further cause the apparatus to:
    select a first predetermined non-instantiated agent from a plurality of non-instantiated agents.

13. The apparatus of claim 10, wherein the instructions further cause the apparatus to:
    send, via an agent status application programming interface (API), the one or more predetermined agent instance names of one or more inactive agent instances.

14. The apparatus of claim 10, wherein the instructions further cause the apparatus to:
    send, via an agent status API and based on the instantiation of the new agent instance, a status of the new agent instance.

15. The apparatus of claim 10, wherein the instructions further cause the apparatus to:
    determine, based on a determination that the container has been deployed, whether at least one agent instance associated with the container is inactive; and obtain, based on a determination that the at least one agent instance is inactive, agent instance information for the inactive at least one agent instance, wherein the request for the preconfigured agent object is further based on the obtained agent instance information.

16. The apparatus of claim 10, wherein the instructions to send the client identification and the password further cause the apparatus to:

send, via a management agent associated with the container, the client identification and the password.

17. The apparatus of claim 10, wherein a compute instance is instantiated in the memory of the apparatus, wherein the compute instance comprises a management agent and a task, wherein the task comprises the container, and wherein the instructions to determine whether the container has been deployed cause the management agent to determine whether the container has been deployed.

18. The apparatus of claim 10, wherein a compute instance is instantiated in the memory of the apparatus, wherein the compute instance comprises a task, wherein the task comprises the container, wherein the container comprises a management agent and one or more job agents, and wherein the instructions to determine whether the container has been deployed cause the management agent to identify when the container has been recently deployed.

19. One or more non-transitory computer-readable media storing instructions that, when executed by one or more processors, cause the one or more processors to perform steps comprising:

receiving, for a container, container configuration information comprising:

a container name; and one or more agent identifications associated with one or more agent instances;

receiving one or more agent identifications of one or more active agent instances having been instantiated in the container;

identifying, based on a comparison between the container configuration information and the one or more agent identifications of the one or more active agent instances, an agent identification of a non-instantiated agent;

sending, to an authentication process and based on an identification of the agent identification of the non-instantiated agent, a client identification and a password;

receiving, based on the client identification and the password, an access token;

sending, with the access token and based on the identification of the agent identifications of the non-instantiated agent, a request for a preconfigured agent object, wherein the request comprises the agent identification of the non-instantiated agent;

receiving, based on the request, the preconfigured agent object associated with the agent identification of the non-instantiated agent;

instantiating, based on the preconfigured agent object, a new agent instance, wherein the new agent instance is associated with the container;

scheduling performance, based on the instantiation of the new agent instance, of a task by the new agent instance; and updating, via an agent status API and associated with the container, the status of the new agent instance.

20. The one or more non-transitory computer-readable media of claim 19, wherein names of all agent instances are predetermined.

* * * * *